UNITED STATES PATENT OFFICE.

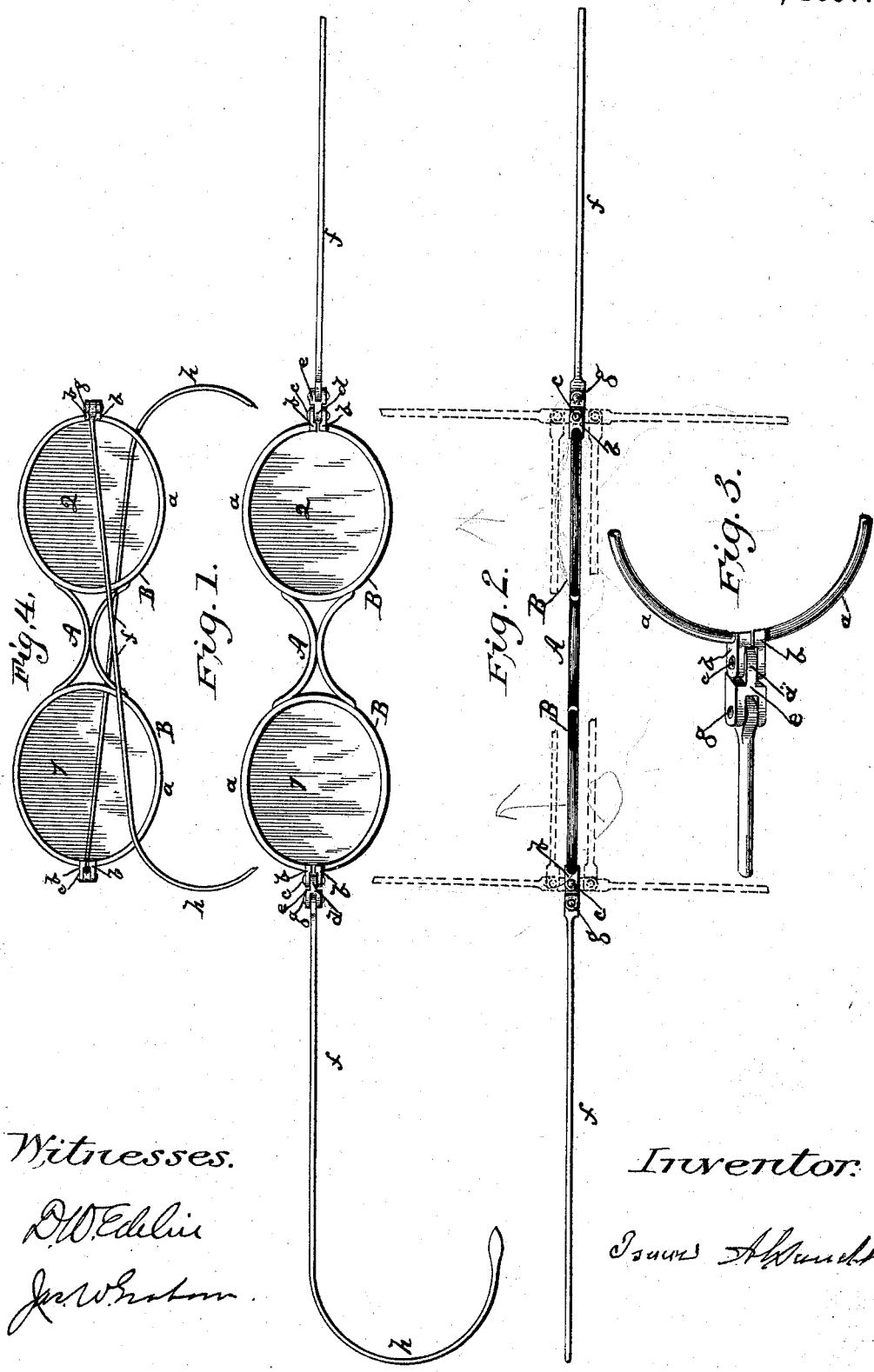

ISAAC ALEXANDER, OF WASHINGTON, DISTRICT OF COLUMBIA, ASSIGNOR OF ONE-HALF TO WALTER E. REID, OF SAME PLACE.

SPECTACLE-FRAME.

SPECIFICATION forming part of Letters Patent No. 584,765, dated June 22, 1897.

Application filed September 22, 1896. Serial No. 606,690. (No model.)

*To all whom it may concern:*

Be it known that I, ISAAC ALEXANDER, a citizen of the United States, residing at Washington city, in the District of Columbia, have invented certain new and useful Improvements in Spectacle-Frames; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to render spectacles reversible, so as to change the position of the lenses in relation to the eyes from left to right, and vice versa, and in either position bringing the temple-bars into proper position for the ear-hooks to catch the ears. The changing of the position of the lenses is also applicable to eyeglasses or frames without the temple-bars or glasses of different vision connected by a spring nose-clamp or other means for securing the same in position upon the face.

In the drawings, Figure 1 is a view in elevation of a pair of spectacles, showing my improvements, the outer end of one of the temple-bars being removed. Fig. 2 is an edge view of Fig. 1, showing in dotted lines the different positions the parts may assume. Fig. 3 is a view in perspective, on an enlarged scale, of a device or mode of connecting the temple-bars with the lens-frames; and Fig. 4 is a view in elevation showing the temple-bars folded to or against the lens-frames, one at each side thereof.

To an X-bridge A are secured lens-clamps B, formed of any suitable material and consisting of a grooved rim $a$ of the form of the lens, having clips $b$ secured thereto or formed of the same material therewith and provided with holes for the reception of a screw or rivet $c$. The clips are shown as enlarged or flanged at their junction with the rim, so that when the flanges meet in bringing them together there is left an unobstructed space between their outer ends, into which one end $d$ of a short stud or link $e$ is inserted. The screw or rivet $c$ completes the lens-clamp and passes through the end of the stud $d$ and serves as a pivot thereto, about which it may freely turn. The outer end of this stud is slotted to receive the end of a temple-bar $f$. The walls of this slot are drilled to receive a rivet or screw $g$, which passes through a hole in the end of the temple-bar inserted in the slot and serves as a pivot to the temple-bar.

The temple-bars are provided with the usual ear-hooks $h$.

My improvements are especially adaptable to persons having lost the sight of one eye, as one of the lenses, 1, may be for reading or examining objects near by and the other, 2, for looking at distant objects. It is a right or left eyed spectacle or spectacle-frame, and by pivoting the temple-bars so as to be capable of being turned toward each other upon or against the lens-frames or into a position parallel therewith and adjacent thereto at either side thereof the hooks at the ends of the temple-bars are always in proper position to catch the ears either way the spectacles may be brought to the face.

What I believe to be new, and desire to secure by Letters Patent, is—

1. In a spectacle-frame, a bridge-piece connecting the spectacles, clips attached to said spectacles, temple-bars, a link for each temple-bar, a pivot turning on a vertical axis and connecting each link to the adjacent clip, and a pivot turning on a vertical axis and connecting each temple-bar to the outer end of each link, substantially as described.

2. A spectacle-frame comprising the lens-frames having clips, the bridge-piece, the temple-bars and a link for each temple-bar each of said links being pivoted at one end to the adjacent clip and having the end of the adjacent temple-bar pivoted to its other end and each of said pivots turning upon a vertical axis substantially as described.

In testimony whereof I affix my signature in presence of two witnesses.

ISAAC ALEXANDER.

Witnesses:
ROSCOE C. PEACOCK,
WM. A. NOËL, Jr.